United States Patent
Lee

(10) Patent No.: US 10,962,819 B2
(45) Date of Patent: Mar. 30, 2021

(54) VARIABLE TRANSPARENCY GLASS AND APPARATUS OF CONTROLLING TRANSPARENCY OF THE SAME

(71) Applicants: Hyundai Motor Company, Seoul (KR); Kia Motors Corporation, Seoul (KR)

(72) Inventor: Sung Woo Lee, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/663,994

(22) Filed: Oct. 25, 2019

(65) Prior Publication Data

US 2021/0011315 A1 Jan. 14, 2021

(30) Foreign Application Priority Data

Jul. 9, 2019 (KR) .................. 10-2019-0082655

(51) Int. Cl.
*G02F 1/1334* (2006.01)
*G02F 1/1343* (2006.01)
*B60J 3/04* (2006.01)
*G02F 1/133* (2006.01)

(52) U.S. Cl.
CPC .............. *G02F 1/1334* (2013.01); *B60J 3/04* (2013.01); *G02F 1/13306* (2013.01); *G02F 1/13439* (2013.01); *G02F 2203/01* (2013.01)

(58) Field of Classification Search
CPC .................................................. G02F 1/1334
See application file for complete search history.

(56) References Cited

U.S. PATENT DOCUMENTS

| | | | |
|---|---|---|---|
| 6,608,660 B1 * | 8/2003 | Okamoto .......... | G02F 1/133514 349/113 |
| 2006/0098281 A1 * | 5/2006 | Fukushima ............ | G02B 30/27 359/464 |
| 2006/0263079 A1 * | 11/2006 | Koishi .................... | G03B 13/08 396/288 |
| 2011/0063225 A1 * | 3/2011 | Michon ............... | G06F 3/04886 345/169 |
| 2012/0327068 A1 * | 12/2012 | Takagi ................. | G09G 3/3648 345/212 |
| 2013/0278631 A1 * | 10/2013 | Border .................... | G02C 5/143 345/633 |
| 2017/0146239 A1 * | 5/2017 | Masen .................... | F23N 3/002 |
| 2018/0299712 A1 * | 10/2018 | Kim ....................... | C09K 19/544 |
| 2019/0056608 A1 * | 2/2019 | Miura .................. | G02F 1/13378 |
| 2019/0098723 A1 * | 3/2019 | Sadwick ................. | F21K 9/272 |

* cited by examiner

*Primary Examiner* — Sang V Nguyen
(74) *Attorney, Agent, or Firm* — Slater Matsil, LLP

(57) ABSTRACT

A variable transparency glass includes a first film having a first transparent electrode on an inner surface of the first film, a 2nd film having a second transparent electrode on an inner surface of the second film, and a liquid crystal capsule disposed between the first film and the second film. The variable transparency glass is configured to control transmittance of an incident light in response to a voltage applied to each of the first transparent electrode and the second transparent electrode. The transmittance is partially controlled corresponding to an aligning pattern of each of the first transparent electrode and the second transparent electrode when the first film and the second film overlap.

20 Claims, 14 Drawing Sheets

VARIABLE TRANSPARENCY GLASS AND APPARATUS OF CONTROLLING TRANSPARENCY OF THE SAME

CROSS-REFERENCE TO RELATED APPLICATIONS

This application claims priority to Korean Patent Application No. 10-2019-0082655, filed in the Korean Intellectual Property Office on Jul. 9, 2019, which application is hereby incorporated herein by reference.

TECHNICAL FIELD

The present disclosure relates to a variable transparency glass and an apparatus for controlling the same.

BACKGROUND

A variable transparency switching window (VTSW) applied to a front glass, a sunroof, or the like of a vehicle is capable of switching transmittance in response to each transparency. Accordingly, an apparatus for controlling the transmittance has been designed to provide the transparency in accordance with selection of a user.

In general, the variable transparency glass includes a transmissive layer which is capable of changing light transmittance and optical characteristics in response to a power source applied to a supply electrode terminal through two power supply electrodes. For the transmissive layer to have the above-described characteristics, the variable transparency glass includes the transmissive layer mainly including liquid polymer.

Recently, the variable transparency glass described above has been applied to a glass of the vehicle and thus, the transparency of the glass of the vehicle may be switched based on the selection of the user. Furthermore, when a head-up display is applied to the vehicle, transparency adjustment of the front glass of the vehicle is an essential element.

Meanwhile, in the variable transparency glass having the above-described configuration, it is difficult to adjust the transparency based on the selection of the user. Furthermore, when the transparency adjustment glass, in which the transmissive layer is formed to have a gas structure, is manufactured, gas density is unbalanced and an additional circuit for driving the gas structure is required.

SUMMARY

The present disclosure relates to a variable transparency glass and an apparatus for controlling the same. In particular embodiments relate to a glass which variably controls transmittance of an incident light.

Embodiments of the invention can solve problems occurring in the prior art while advantages achieved by the prior art are maintained intact.

An aspect of the present disclosure provides a variable transparency glass which is capable of adjusting transparency and selectively adjusting a certain portion of the glass based on a user's request and an environment, and an apparatus for controlling transparency thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a variable transparency glass includes a first film that has a first transparent electrode on an inner surface of the first film, a second film that has a second transparent electrode on an inner surface of the second film, and a liquid crystal capsule that is disposed between the first film and the second film and to control transmittance of an incident light in response to a voltage applied to each of the first transparent electrode and the second transparent electrode. The transmittance is partially controlled corresponding to an aligned pattern of each of the first transparent electrode and the second transparent electrode when the first film and the second film overlap.

According to another aspect of the present disclosure, an apparatus for controlling a variable transparency glass includes a glass that variably controls transmittance depending on a voltage, a voltage controller that supplies the voltage to the variable transparency glass, and a controller that selects a transmittance mode in response to input information and to control a level of the voltage based on the selected transmittance mode. The transparency glass includes a first film that has a first transparent electrode on an inner surface of the first film, a second film that has a second transparent electrode on an inner surface of the second film, and a liquid crystal capsule that is disposed between the first film and the second film and to variably control transmittance of an incident light in response to a voltage applied to each of the first transparent electrode and the second transparent electrode.

BRIEF DESCRIPTION OF THE DRAWINGS

The above and other objects, features and advantages of the present disclosure will be more apparent from the following detailed description taken in conjunction with the accompanying drawings:

FIG. 7, which includes

DETAILED DESCRIPTION OF ILLUSTRATIVE EMBODIMENTS

Figure 1:
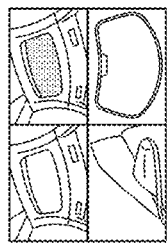
FIG. 1 is a view illustrating a concept of a variable transparency glass according to an embodiment of the present disclosure.
Figure 1:
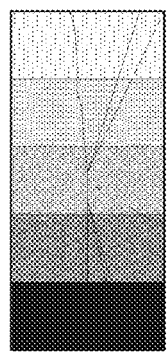
Figure 1:
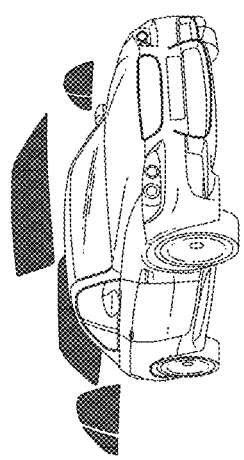
Figure 1:
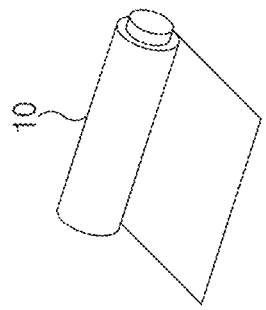

Hereinafter, embodiments of the present disclosure will be described in detail with reference to the accompanying drawings. It should be noted that, in adding reference numerals to the constituent elements of the drawings, the same constituent elements are denoted by the same reference symbols as possible even if they are shown in different drawings. Furthermore, in the following description of the embodiments of the present disclosure, a detailed description of known functions and configurations incorporated herein will be omitted when it may make the difference that the embodiments of the present disclosure are not conclusive.

FIG. 1 is a view illustrating a concept of a variable transparency glass according to an embodiment of the present disclosure.

Referring to FIG. 1, an embodiment of the present disclosure may use a variable transparency glass 10, which has a smart window film form, to control a difference in transmittance and refractive index in response to an electric field reaction. The variable transparency glass 10 is cut based on a shape of a glass for a vehicle or a shape of an object using the smart window film, and is molded to be mounted.

The variable transparency glass 10 may variably control the transmittance of the vehicle window. When the variable transparency glass 10 is applied to the vehicle, safety and convenience of the vehicle may be improved.

As functions of the vehicle gradually evolve and meet a future autonomous driving age, the vehicle may provide value as a residential space, not a mere means of transportation. To this end, the variable transparency glass 10 according to an embodiment of the present disclosure may be applied to an autonomous driving vehicle. Here, a privacy zone may be formed, and an occupant may be protected from external environments such as ultraviolet rays, infrared rays, excessive temperature changes, and the like.

Figure 2:
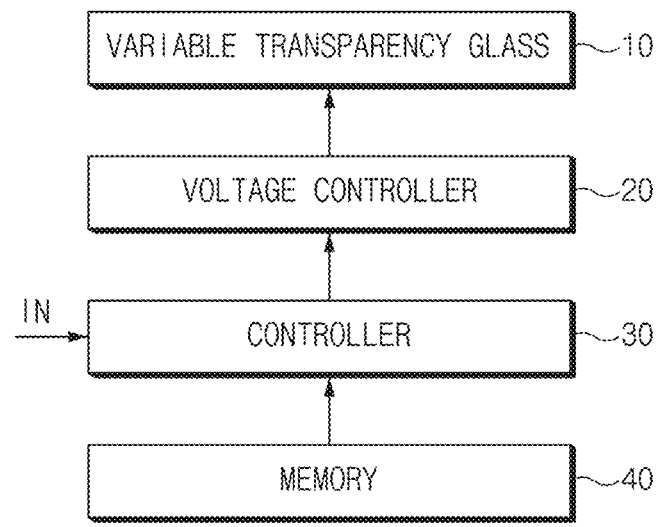
FIG. 2 is a block diagram of an apparatus for controlling a variable transparency glass according to an embodiment of the present disclosure.

FIG. 2 is a block diagram of an apparatus for controlling a variable transparency glass according to an embodiment of the present disclosure.

Referring to FIG. 2, an apparatus for controlling a variable transparency glass according to an embodiment of the present disclosure includes the variable transparency glass 10, a voltage controller 20, a controller 30, and a memory 40.

Here, the variable transparency glass 10 has a thin film structure in which a transparency electrode film is deposited and rubbed. The variable transparency glass 10 may switch the transmittance and may control a change of a low refractive index. The variable transparency glass 10 has light transparency depending on a change of the electric field, which is formed between internal transparent electrodes and variably controls the light transparency based on a voltage source, which is applied to the internal transparent electrodes.

The variable transparency glass 10 switches transmittance of each window manually or automatically using a separate switch operation, integrated control of a display device for a vehicle (e.g., a navigation terminal and an audio video navigation (AVN)), control of a user interface (UI), or a smart phone application (Bluelink, etc.). The transmittance of the variable transparency glass 10 may be varied based on a user control mode or an automatic transmittance control mode to provide optimum window transmittance in a driving environment of the vehicle.

In addition, the voltage controller 20 is controlled by the controller 30 and provides a linear voltage to the transparent electrodes of the variable transparency glass 10. The voltage controller 20 uses a converter including a switching device (e.g., an MOSFET) to decrease or increase the voltage. Therefore, the linear voltage is provided to the variable transparency glass 10. In addition, the voltage controller 20 blocks the voltage which is output upon shut-down, ramps a tunable soft-start current, and limits a foldback output current.

Furthermore, the controller 30 may select and control a transmittance mode corresponding to input information IN. The controller 30 controls the voltage applied to the variable transparency glass 10 in the voltage controller 20 based on transparency information selected by the user. The controller 30 may apply a voltage having one level selected among a plurality of levels to variously implement the transmittance of the variable transparency glass 10 in multiple stages.

Furthermore, the controller 30 may automatically control the transmittance mode based on the driving environment of the vehicle (e.g., weather, amount of sunshine, illuminance change, tunnel, glare, autonomous mode). Here, the controller 30 may work along with a global positioning system (GPS) and a rain sensor to automatically control the transmittance mode optimized in a dark driving environment such as a tunnel and a rainfall. In addition, an external temperature and visible light are detected by a sensor to control the transparency of the sunroof glass to be shielded.

For example, the controller 30 may set a mode to transmit natural light in a bright mode (transmittance of 70% or more). When a surrounding environment, such as the tunnel or the rain, becomes dark due to low illuminance, the controller 30 may be set to the bright mode, automatically.

Furthermore, the controller 30 may set the bright mode when the vehicle moves backward. That is, when the vehicle moves backward, a rear glass and a side mirror (an inside side rear view mirror (ISRVM), an outside side rear view mirror (OSRVM)) may be automatically switched to the bright mode, thereby ensuring safety and improving visibility of the vehicle. According to another embodiment, the controller 30 may be set to the bright mode by the driver's request or manual operation during autonomous driving of the vehicle.

The controller 30 may set a mode to shield the light variably in a variable tinting mode (transmittance of 69 to 25%). That is, the controller 30 may set the variable tinting mode to shield direct sunlight when the vehicle is parked or stopped. Furthermore, the transmittance of each glass is controlled based on a viewing mode of the display device for the vehicle (a gradual opaque mode in response to illuminance and backlight), to improve visibility of contents.

Furthermore, the controller 30 may set a mode to completely shield the light for a privacy suite zone in a privacy mode (transmittance of 25% or less). That is, the controller 30 switches a mode to the privacy mode when a driver rests during autonomous driving of the vehicle or sleeps, thereby providing comfortable transmittance (transmittance of 30% or less).

Here, a sleep state of a driver may be detected by checking a heart rate of the driver, by tracking pupil using a camera, or by a driver's request. In addition, when an occupant in a back seat requests to be switched to the privacy mode, the transmittance of a rear window may be controlled.

According to an embodiment, the transmittance may be remotely switched when outside temperature changes or weather changes after parking of the vehicle. When the outside temperature rises after the parking of the vehicle, the user may switch a setting mode of the controller 30 to the opaque mode using the smartphone application to shield ultraviolet rays, visible light, and the like.

The memory 40 may include a look-up table (LUT) derived by preliminary experiment and evaluation to be established and may store transmittance control information corresponding to each mode. The look-up table is a data table in which voltage values provided to the variable transparency glass 10 are set in response to transparency or gray level of the variable transparency glass 10. In an embodiment of the present disclosure, the controller 30 controls the voltage of the voltage controller 20 based on data stored in the look-up table of the memory 40.

The memory 4o may provide the data of the lookup table when the selection of the user is input upon voltage control of the controller 30 to maximize response speed of transmittance adjustment in response to the selection of the user.

Figure 3:
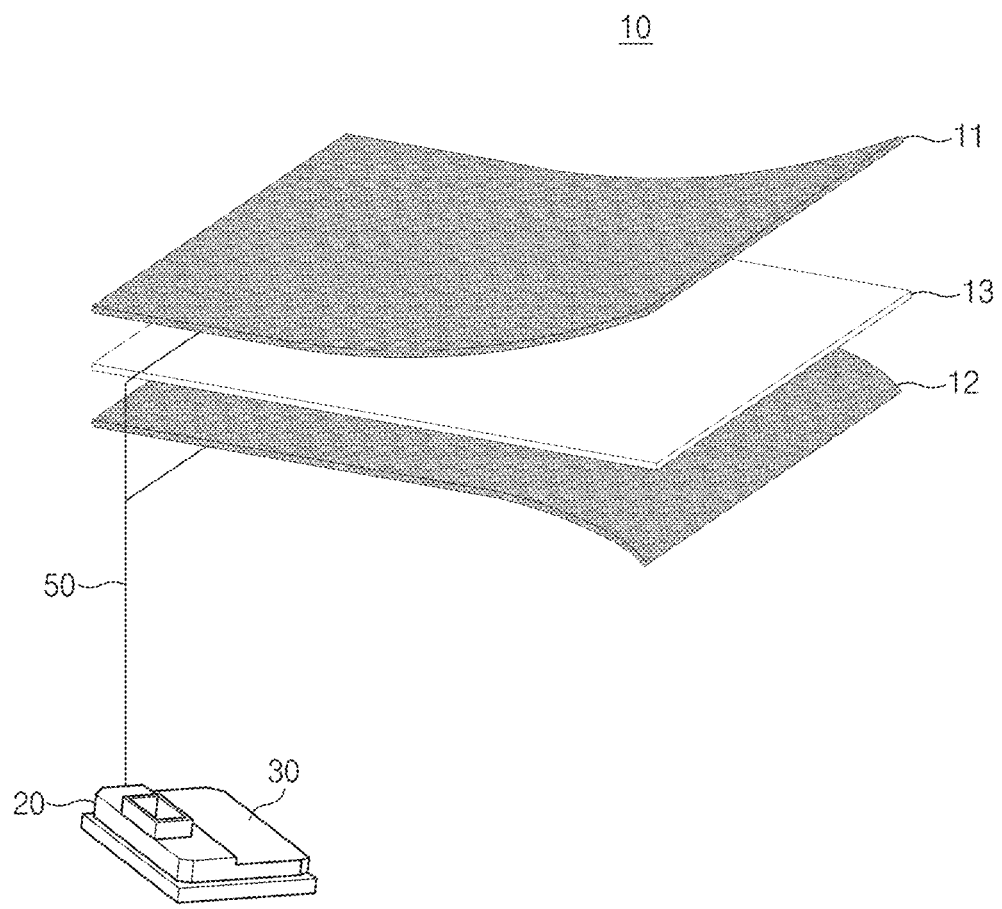
FIG. 3 is a detailed configuration diagram of a variable transparency glass according to an embodiment of the present disclosure.

FIG. 3 is a detailed configuration diagram of a variable transparency glass according to an embodiment of the present disclosure.

Referring to FIG. 3, the variable transparency glass 10 according to an embodiment of the present disclosure includes a first film 11, a second film 12, and a liquid crystal (LC) capsule 13.

The first film 11 and the second film 12 may be formed of a plate-shaped transparent material, and may be disposed on both upper and lower sides of the variable transparency glass 10, respectively. The first film 11 and the second film 12 may control the refractive index corresponding to the electric field reaction. Here, the first film 11 and the second film 12 may integrally embed the transparent electrodes which are aligned in a vertical, horizontal, or diagonal direction with respect to an optical axis on an inner surface of each of the first and second films 11 and 12 and are rubbed.

Furthermore, the liquid crystal capsule 13 capable of controlling a phase is mounted between the first film 11 and the second film 12. The transmittance in response to the phase of the liquid crystal capsule 13 may be controlled by the power supplied from the voltage controller 20. The liquid crystal capsule 13 controls the phases of the first film 11 and the second film 12. The liquid crystal capsule 13 has the refractive index which is capable of maintaining an identical or similar level with respect to a vertical direction of a circularly polarized light source.

Here, the liquid crystal capsule 13 is a capsule-type liquid crystal bundle of a polymer dispersed liquid crystal (PDLC) structure, and is capable of being changed into a transparent or opaque state depending on whether the electric field is applied or not.

For example, the liquid crystal capsule 13 may have physical properties in which Min @ 100 μm, ε∥≥9.5, ε⊥3.3, anisotropic ne=1.6, and no=1.2. In an embodiment of the present disclosure, the physical properties of the liquid crystal capsule 13 which are representative values of a polymer satisfying a sheet resistance, a conductivity, and a refractive index may be calculated depending on the experimental data. However, the physical properties of the liquid crystal capsule 13 are not limited thereto.

The liquid crystal capsule 13 may have anisotropic dielectric constants and may be excellent in contrast ratio. The liquid crystal capsule 13 may be aligned perpendicularly, horizontally, or diagonally to a base surface by vertical and horizontal aligning. As described above, the liquid crystal capsule 13 does not greatly affect the arrangement of the liquid crystal, and the transmittance with low turbidity (low refractive index) before and after voltage application may be controlled and may have excellent viewing angle characteristics.

Furthermore, the variable transparency glass 10 and the voltage controller 20 are connected by a power cable 50. The power cable 50 may be formed of a flexible flat cable (FFC) structure. The power cable 50 is connected to the variable transparency glass 10 as an integral type or a fastening type as a lead type.

Figure 4:
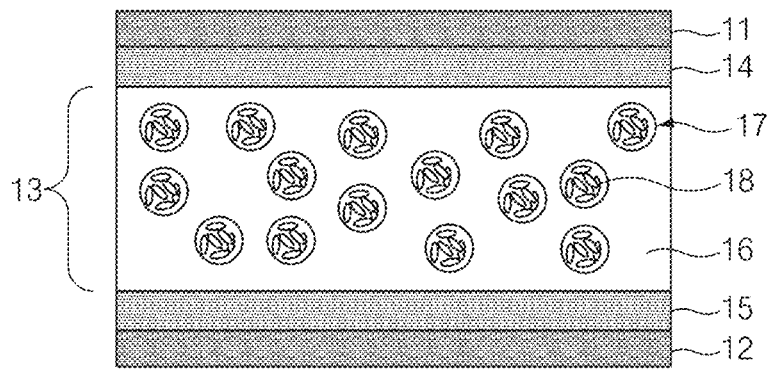
FIGS. 4 and 5 are cross-sectional views of the variable transparency glass of FIG. 3.
Figure 5:
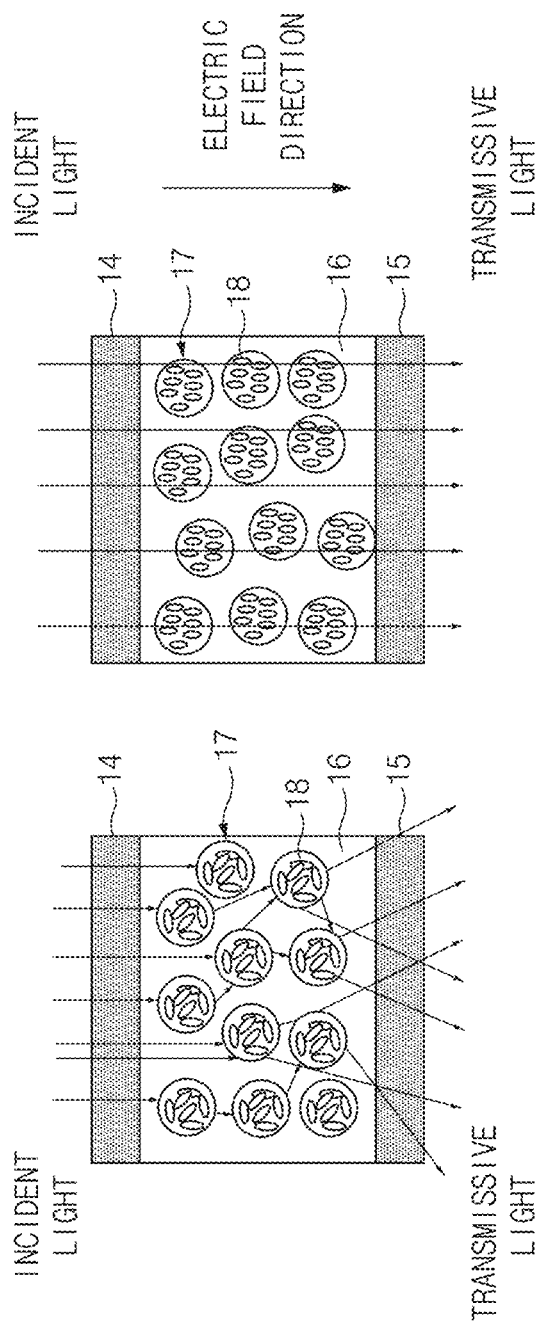

FIGS. 4 and 5 are cross-sectional views of the variable transparency glass 10 of FIG. 3.

Referring to FIG. 4, the variable transparency glass 10 includes the liquid crystal capsule 13 provided between the first film 11 and the second film 12.

According to an embodiment, the first film 11 and the second film 12 may be made of multiple polyesters (e.g., polyethylene terephthalate (PET), 1PLY, 2PLY), a dyed, a chip dyed, carbon, metal, ceramics, sputter, nano-carbon ceramic, or the like.

Here, a dyed film is a color conversion film using relaxation shrinkage of a film. In addition, a chip dyed film is a film formed of a color film material itself. A carbon film is a film in which carbon is added to a film material to improve durability. A metal film is a film in which a metal is deposited on a surface of the film to be coated.

A ceramics film is a film in which non-metallic and inorganic material is processed and molded at high temperature. A sputter film is a film in which a metal component is thinly coated in an atomic structure at a vacuum state. A nano carbon ceramic film is a film in which the carbon film and the ceramic film are combined.

Furthermore, a first transparent electrode 14 is included on an inner surface of the first film 11 and a second transparent electrode 15 is included on an inner surface of the second film 12. Here, the first transparent electrode 14 and the second transparent electrode 15 may be a light-transmitting inorganic substrate or an organic substrate, or a stacked electrode of the inorganic substrate or the organic substrate in a homogeneous manner or a heterologous manner.

The transparent electrodes 14 and 15 has a sufficient carrier, which is a medium for transporting electric charges, and has a low resistance to make the carrier move easily, thereby increasing electric current rate. The transparent electrodes 14 and 15 are transparent materials to allow the light to pass therethrough. The transparent electrodes 14 and 15 may be defined based on correlation of a thickness, resistance and conductivity, and transmittance of each of the electrodes 14 and 15.

Since the transparent electrodes 14 and 15 are very thin films, the resistance is sensitively changed even with a small thickness change. The transparent electrodes 14 and 15 may have a sheet resistance, which is a resistance of a surface of the material, set below a specific resistance (e.g., 1000 Ω/sq) regardless of the thickness.

Conductivity and transmittance may be determined depending on a bandgap width of the transparent electrodes 14 and 15. That is, when the bandgap width is increased, the conductivity is decreased but the transparent electrodes 14 and 15 become transparent. When the bandgap width is decreased, the conductivity is increased but the transparent electrodes 14 and 15 become opaque.

Accordingly, when the thickness is increased, the resistance is decreased and the conductivity is increased, but the transmittance is decreased. On the contrary, when the thickness is decreased, the resistance is increased and the conductivity is decreased to be transparent.

For example, the transparent electrodes 14 and 15 may be formed of a transparent conductive material of indium tin oxide (ITO), indium zinc oxide (IZO), graphene, poly (ethylenedioxythiophene), polystyrenesulfonate (PEDOT:PSS), silver nanowire, and carbon nanotube (CNT).

Here, indium tin oxide is formed by combination of indium oxide ($In_2O_3$) and tin oxide ($SnO_2$) to have excellent electrical conductivity, to have a high transmittance, to provide an electrical signal, and to transmit the light. Graphene is a planar layer structure arranged in a hexagonal net of carbon honeycomb. The graphene has high electrical conductivity, fast electron transfer, high strength and thermal conductivity, and is applicable to a flexible device.

Polystyrenesulfonate, which is a conductive polymer, polymerizes ethylene dioxythiophene (ethylenedioxythiophene (EDOT)) monomer to be synthesized. Polystyrenesulfonate has a high electrical conductivity, and excellent flexibility and stability, and performs a simple coating process.

A silver nanowire is a nanometer microscopic wire bundle having a silver cross section. The silver nanowire, which is formed by growing nano-sized silver (Ag) on a substrate in wire form, is excellent in transparency and conductivity. Carbon nanotube is bundle-shaped material in which carbons are connected like a honeycomb, have a hexagonal honeycomb pattern, and have a size of 1 nanometer.

In addition, the liquid crystal capsule 13 includes a variable transmissive layer 16, liquid crystal droplets 17, and liquid crystal molecules 18. The variable transmissive layer 16, which is a polymer optical device, may be used as a polymeric optical refractive material. The variable transmissive layer 16 may be made of a transmissive liquid crystal polymer structure. The liquid crystal capsule 13 may be disposed to fill a space between the first transparent electrode 14 and the second transparent electrode 15.

The liquid crystal capsule 13 having the above-described structure has the light transmittance depending on the change of the electric field formed between the first transparent electrode 14 and the second transparent electrode 15. Therefore, the liquid crystal capsule 13 forms an opaque glass because light transmittance becomes low when power is applied. The liquid crystal capsule 13 is characterized in which the light transmittance is decreased as the voltage to be applied is increased.

Referring to FIG. 5, the variable transmissive layer 16 becomes a shade state when the voltage is not applied between the first transparent electrode 14 and the second transparent electrode 15, thereby shielding the light. The liquid crystal capsule 13 is a material having a light transmissive property. Therefore, when the voltage is applied between the first transparent electrode 14 and the second transparent electrode 15, the electric field is formed in the liquid crystal capsule 13.

Accordingly, the variable transmissive layer 16 has a polarizing property to change a phase of a light incident from the outside to pass therethrough.

For example, the variable transmissive layer 16 may convert the incident light based on the voltage applied to both ends of the first transparent electrode 14 and the second transparent electrode 15. When the polymer has a phase in a vertical state, the light incident from the outside is converted by 0°. Then, when the polymer has an inclined phase (an intermediate state of a vertical and horizontal state), the light incident from the outside is converted by about 45°. In addition, when the polymer has a phase in a horizontal state, the light incident from the outside is converted by about 90°.

Thus, the variable transparency glass 10, which depends on the electric field applied to the variable transmissive layer 16, is configured to have a variety of light transmittance based on the applied voltage and is capable of controlling the transparency and transmittance.

Figure 6:
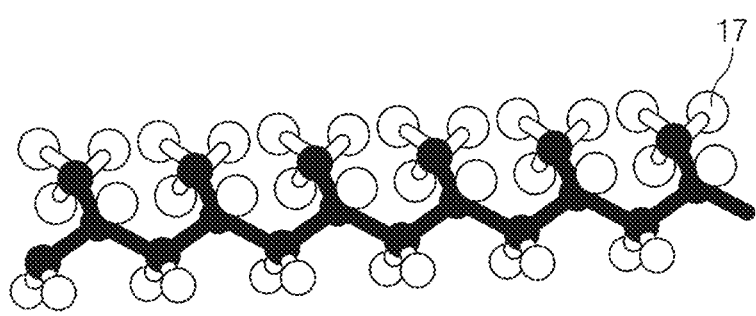
FIG. 6 is an embodiment illustrating a variable transmissive layer of the liquid crystal capsule of FIG. 5.

FIG. 6 illustrates an embodiment in which the liquid crystal droplets 17 included in the variable transmissive layer 16 described above are configured to be in a polymer three-dimensional ball structure.

Figure 7A:
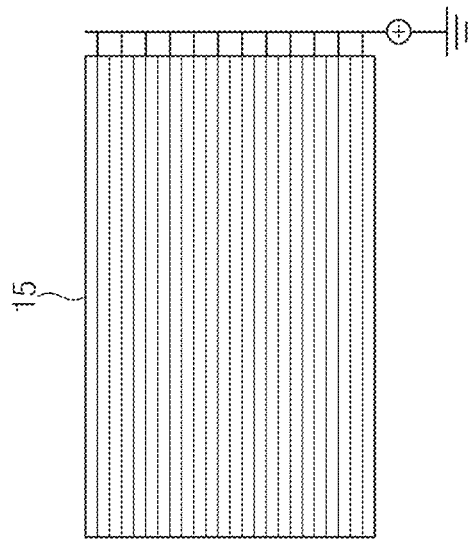
FIGS. 7A and 7B, is a view for illustrating a pattern structure of the variable transparency glass of FIG. 3.
Figure 7B:
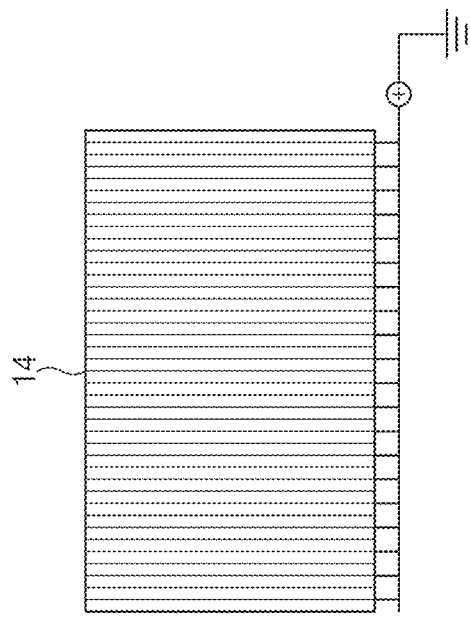

FIG. 7 is a view for illustrating a pattern structure of the variable transparency glass 10 of FIG. 3.

Referring to FIG. 7, in the variable transparency glass 10 according to an embodiment of the present disclosure, alignment pattern structures of the first transparent electrode 14 and the second transparent electrode 15 may be different from each other. For example, sub electrodes of the first transparent electrode 14 may have a pattern structure vertically arranged as shown in (A). Sub electrodes of the second transparent electrode 15 may have a pattern structure horizontally arranged as shown in (B).

Figure 8:
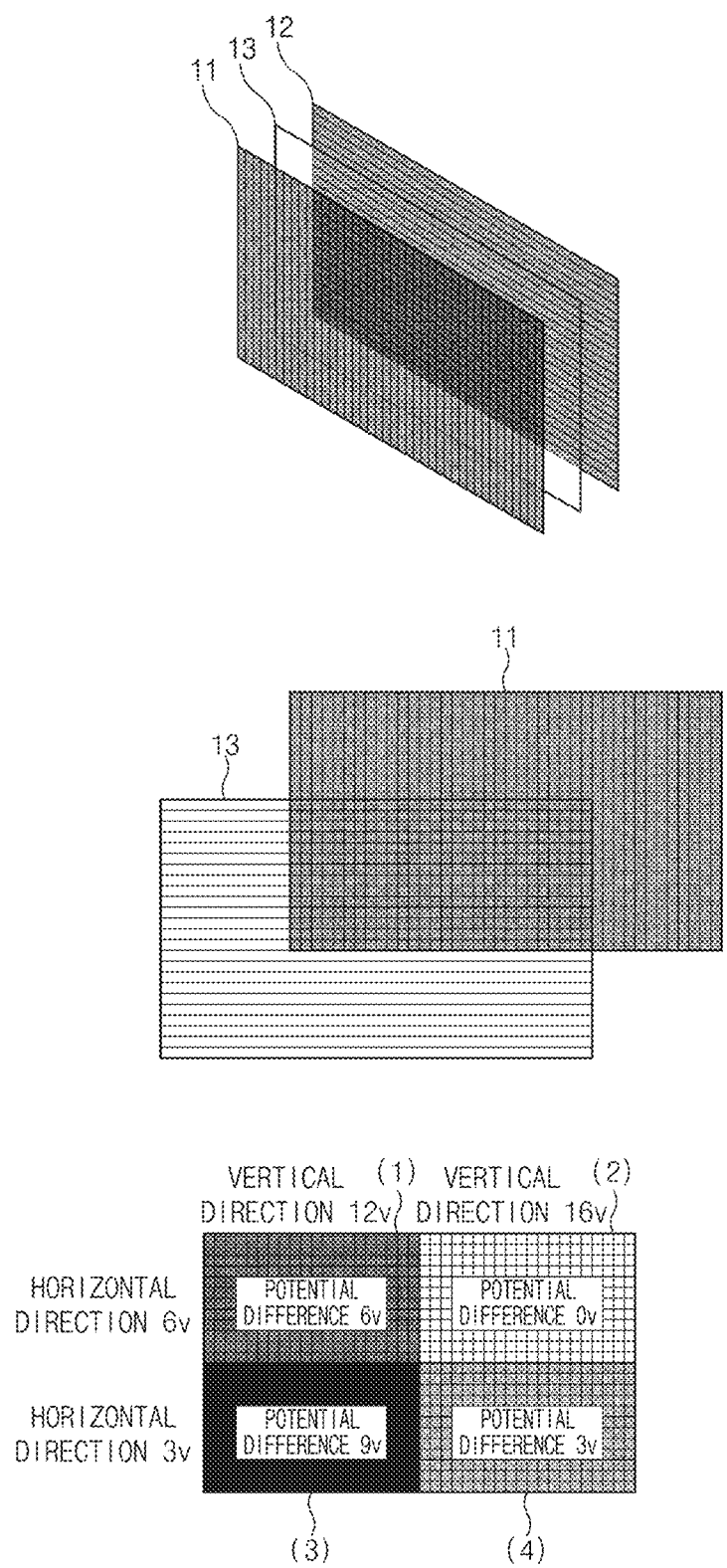
FIG. 8 is a view for illustrating partial transmittance of the variable transparency glass of FIG. 3.

FIG. 8 is a view for illustrating partial transmittance of the variable transparency glass of FIG. 3.

Referring to FIG. 8, the variable transparency glass 10 according to an embodiment of the present disclosure performs partial control for an internal phase when the films 11 and 12 overlap with each other, thereby controlling the transmittance of a selected portion.

The variable transparency glass 10 according to an embodiment of the present disclosure may separate zones of the films 11 and 12 based on the mode set in the controller 30 to control the zones at different transmittances. That is, a portion overlapped by the films 11 and 12 in the same glass are separated into upper/lower and left/right regions. In addition, the variable transparency glass 10 may individually supply a voltage applied from the voltage controller 20 to each separated region, thereby partially controlling transmittance of a region.

For example, a region (1) is provided with a voltage of 12V in the vertical direction and a voltage of 6V in the horizontal direction, and thus a potential difference is set to 6V. A region (2) is provided with a voltage of 6V in the vertical direction and a voltage of 6V in the horizontal direction, and thus the potential difference is set to 0V. A region (3) is provided with a voltage of 12V in the vertical direction and a voltage of 3V in the horizontal direction, and thus the potential difference is set to 9V. A region (4) is provided with a voltage of 6V in the vertical direction and a voltage of 3V in the horizontal direction, and thus the potential difference is set to 3V. Accordingly, in an embodiment of the present disclosure, the transmittance may be partially controlled in response to the potential difference of the separated regions (1) to (4), respectively.

Figure 9:
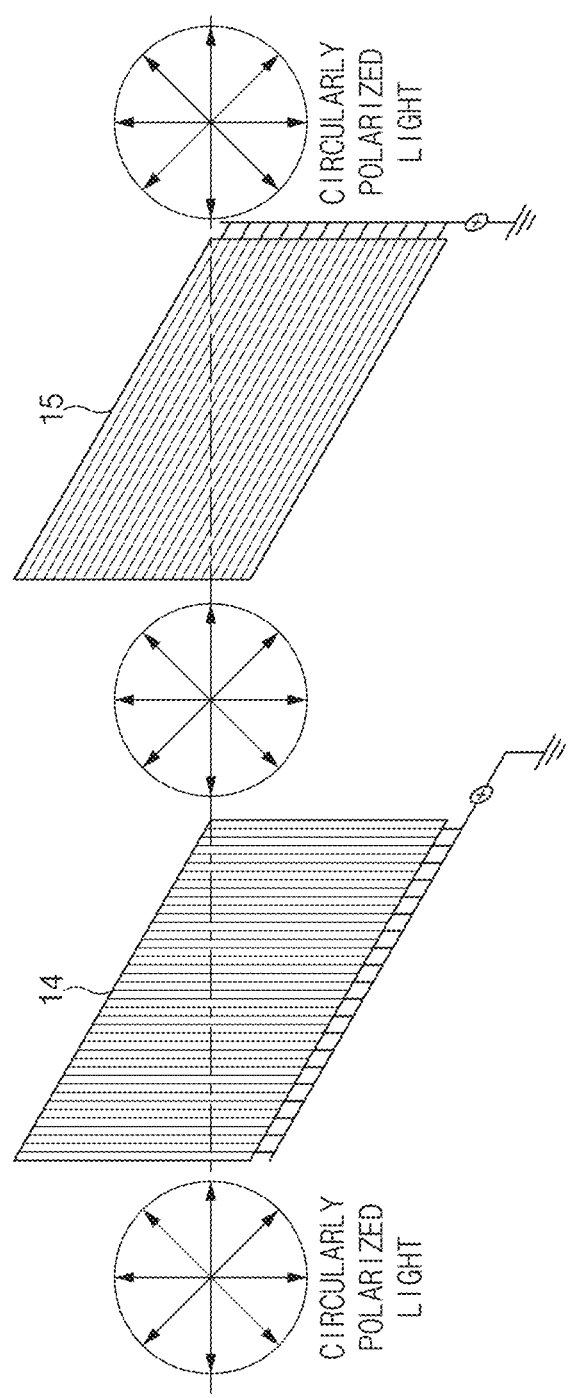
FIGS. 9 and 10 are views for illustrating a transparent mode and an opaque mode depending on a transmittance switch
Figure 10:
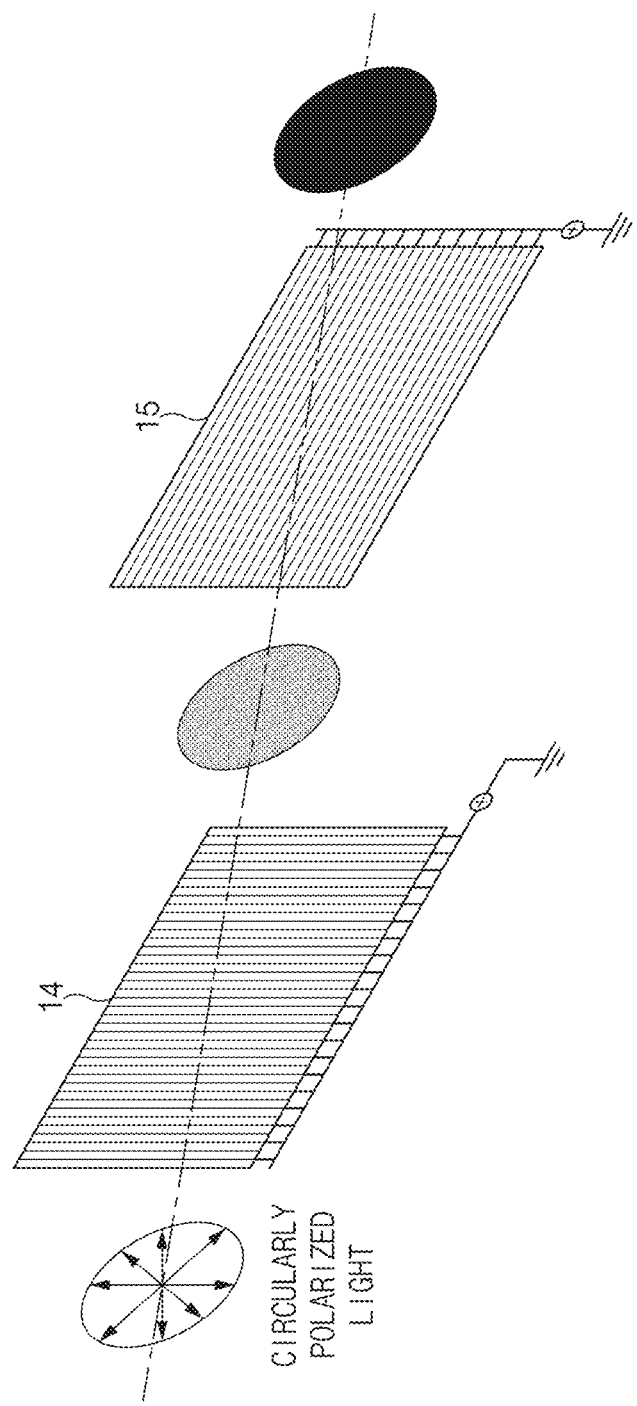

FIGS. 9 and 10 are views for illustrating a transparent mode and an opaque mode depending on a transmittance switch.

An embodiment of the present disclosure may control the phase of the transparent electrodes 14 and 15 to switch the transmittance and the refractive index, thereby controlling a linear change of the transparent mode and the opaque mode.

Referring to FIG. 9, in the 'transparent mode', the transparent electrodes 14 and 15, each having an isotropic refractive index, are aligned and rubbed to be molded. Then, the voltage of the liquid crystal capsule 13 is controlled to control the refractive index and the transmittance with the isotropic refractive index. For example, a refractive index n1 of the films 11 and 12 containing the transparent electrodes 14 and 15 may be controlled to 1.2, and a refractive index n2 of the liquid crystal capsule 13 may be controlled to 1.2.

That is, the refractive index of the liquid crystal capsule 13, the transparent electrode 14 having the vertical pattern and the transparent electrode 15 having the horizontal pattern are all controlled to the isotropic refractive index. Then, an unpolarized light may be transmitted from a light source to implement the transparent mode.

Referring to FIG. 10, in the 'opaque mode', a voltage is controlled to shift a phase of the liquid crystal capsule 13 to π/2 compared to the transparent mode while the isotropic refractive index is maintained. That is, a circularly polarized light is shielded, the refractive index of the liquid crystal capsule 13 is changed, and thus the transmittance is controlled. For example, the refractive index n1 of the films 11 and 12 containing the transparent electrodes 14 and 15 may be maintained at 1.2, and the refractive index n2 of the liquid crystal capsule 13 may be phase-shifted to 1.6 or more.

That is, the circularly polarized light is projected when the transparent electrode 14 having the vertical pattern and the transparent electrode 15 having the horizontal pattern are overlapped. Then, the circularly polarized light is scattered as the refractive index is switched by the liquid crystal capsule 13, and a linearly polarized light is absorbed or quenched to implement the opaque mode in which the circularly polarized light is not transmitted.

Figure 11:
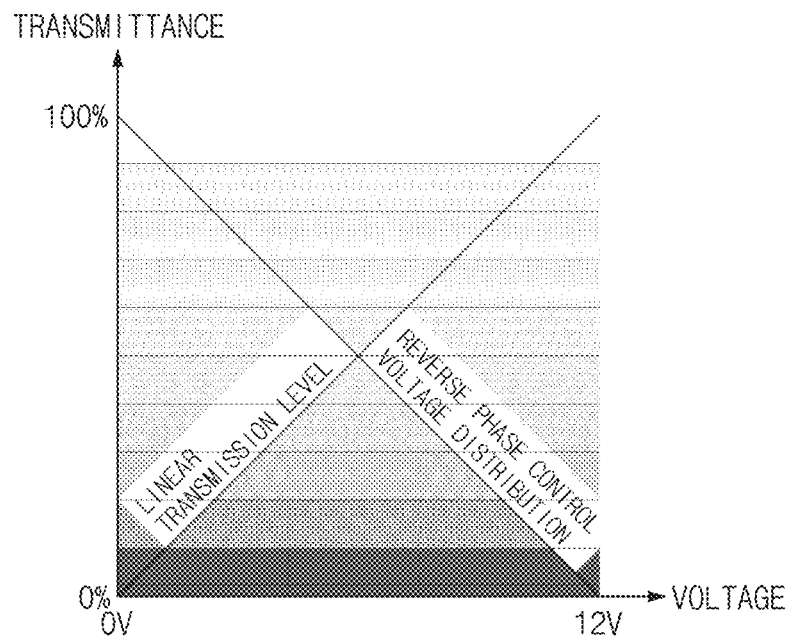
FIG. 11 is a graph for illustrating a transmittance linear control level of the variable transparency glass of FIG. 3.

FIG. 11 is a graph for illustrating a transmittance linear control level of the variable transparency glass of FIG. 3.

Referring to FIG. 11, in an embodiment of the present disclosure, the transmittance may be linearly controlled as the voltage is increased. Conversely, reverse phase control may be performed such that the transmittance is decreased as the voltage is increased.

In an embodiment of the present disclosure, the voltage applied through the voltage controller 20 is linearly controlled to perform the linear control of the transparent mode or the opaque mode. Furthermore, the refractive index is matched to each of the stacked layers for turbidity control, and therefore it is possible to switch the transmittance without haze and scattering.

Figure 12:
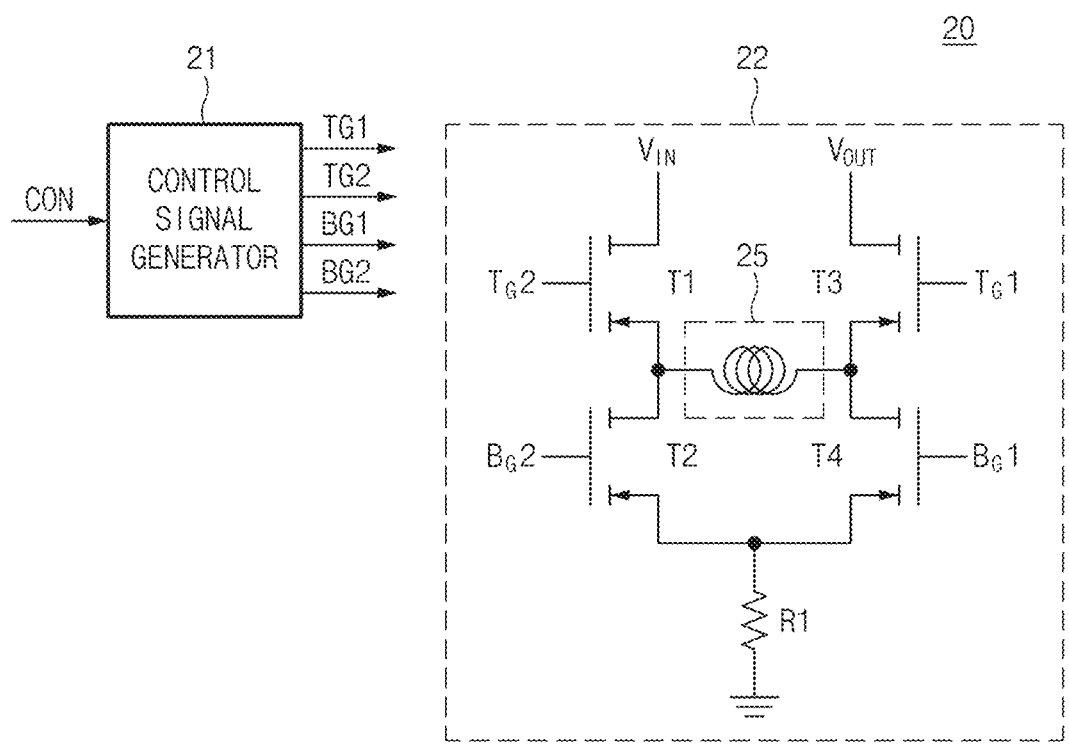
FIG. 12 is a block diagram of the voltage controller of FIG. 2.

FIG. 12 is a block diagram of the voltage controller 20 of FIG. 2.

Referring to FIG. 12, the voltage controller 20 includes a control signal generator 21 and an output switching device 22.

Here, the control signal generator 21 controls a linear voltage level value to automatically switch the transmittance in response to the environment of the vehicle. That is, the control signal generator 21 controls the voltage level value to automatically select a transmittance level in response to a control signal CON applied from the controller 30.

For example, the control signal generator 21 may control the voltage level value to have the transmittance of 70% or more for transmitting the natural light in the bright mode. The control signal generator 21 may control the voltage level value to change the transmittance to a range of 69 to 25% for variably shielding the light in the variable tinting mode. In addition, the control signal generator 21 may control the voltage level value to have the transmittance of 25% or less for completely shielding the light with respect to the privacy sweet zone in the privacy mode.

The control signal generator 21 generates control signals TG1, TG2, BG1, and BG2 for providing a linear output voltage VOUT in response to the control signal CON. The control signal generator 21 may variably control the control signals TG1, TG2, BG1, and BG2 through pulse width modulation.

In addition, the output switching device 22 includes a plurality of switching elements T1 to T4, a resistor R1, and a current ramping device 25.

Here, the plurality of switching elements T1 to T4 may include a switching converter of a metal oxide semiconductor field effect transistor (MOSFET) structure.

That is, the switching elements T1 and T2 are connected in series between an application terminal of input voltage VIN and the resistor R1. A control signal TG2 is applied to the switching element T1 through a gate terminal.

Furthermore, a control signal BG2 is applied to the switching element T2 through the gate terminal. In addition, the switching elements T3 and T4 are connected in series between an application terminal of output voltage VOUT and the resistor R1. The control signal TG1 is applied to the switching element T3 through the gate terminal. The control signal BG1 is applied to the switching element T4 through the gate terminal.

The resistor R1 is connected between one end of the switching elements T2 and T4 and a ground voltage terminal. The current ramping device 25 is connected between a contact of the switching elements T1 and T2 and a contact of the switching elements T3 and T4 to ramp the soft-start current and limit the foldback output current. Here, the current ramping device 25 may include an inductor.

The output switching device 22 having the above configuration decreases or increases the input voltage VIN in response to selective switching operation of the plurality of switching elements T1 to T4 to linearly control the output voltage VOUT.

For example, when the switching element T1 turns on and the switching element T2 turns off, the switching elements T3 and T4 may be switched depending on the control signals TG1 and BG1 to increase the output voltage VOUT. On the other hand, when the switching element T4 turns on and the switching element T3 turns off, the switching elements T1 and T2 may be switched depending on the control signals TG2 and BG2 to decrease the output voltage VOUT.

In addition, when the output switching device 22 is shut-down, the plurality of switching elements T1 to T4 turn off, and thus the input voltage VIN and the output voltage VOUT may be cut off from each other.

In addition, the output switching device 22 switches the phase of the voltage to prevent the liquid crystal capsule 13 from sticking permanently. For example, the output voltage VOUT is switched from 12V to −12V or from 6V to −6V.

Accordingly, the phase of the liquid crystal capsule 13 is reversely driven when starting or turning off the vehicle. For example, the phase of the liquid crystal capsule 13 may be inverted from π to 2π or inverted from π/2 to 3π/2.

Figure 13:
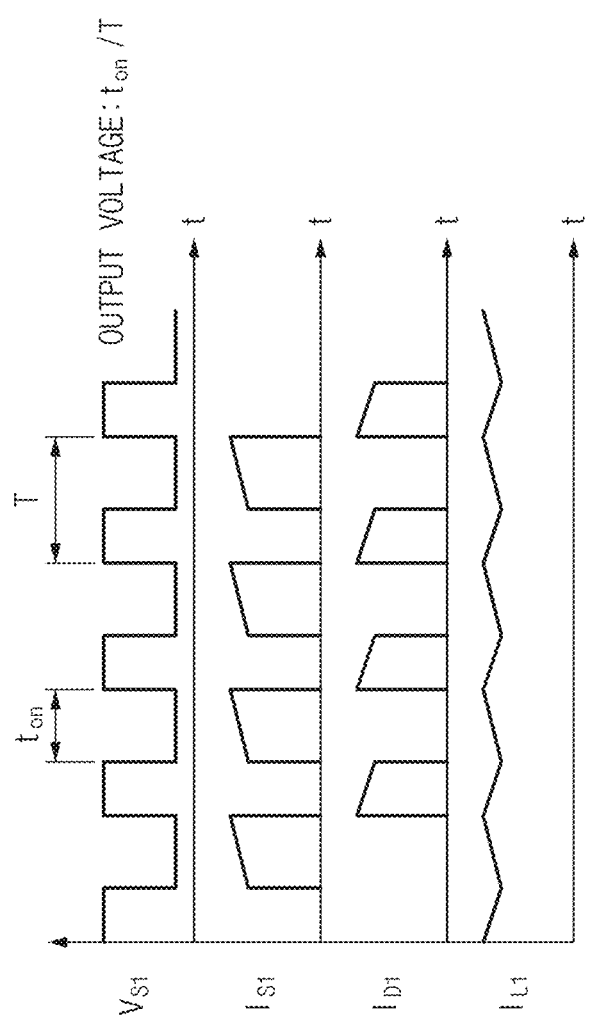
FIG. 13 is a waveform diagram illustrating a control method of the voltage controller of FIG. 12.

FIG. 13 is a waveform diagram illustrating a control method of the voltage controller 20 of FIG. 12.

Referring to FIG. 13, the voltage controller 20 may supply a linear control voltage. In an embodiment of the present disclosure, it will be described as an example that the output switching device 22 has a buck converter structure.

The voltage controller 20 generates a supply current IS1 and a diode current ID1 based on the pulse width of the control signal applied from the control signal generator 21. In addition, an inductor current IL1 maintains a constant current value within a specific range corresponding to the supply current IS1 and the diode current ID1. An output voltage VS1 may be set to Ton (low pulse width)/T (cycle).

Figure 14:
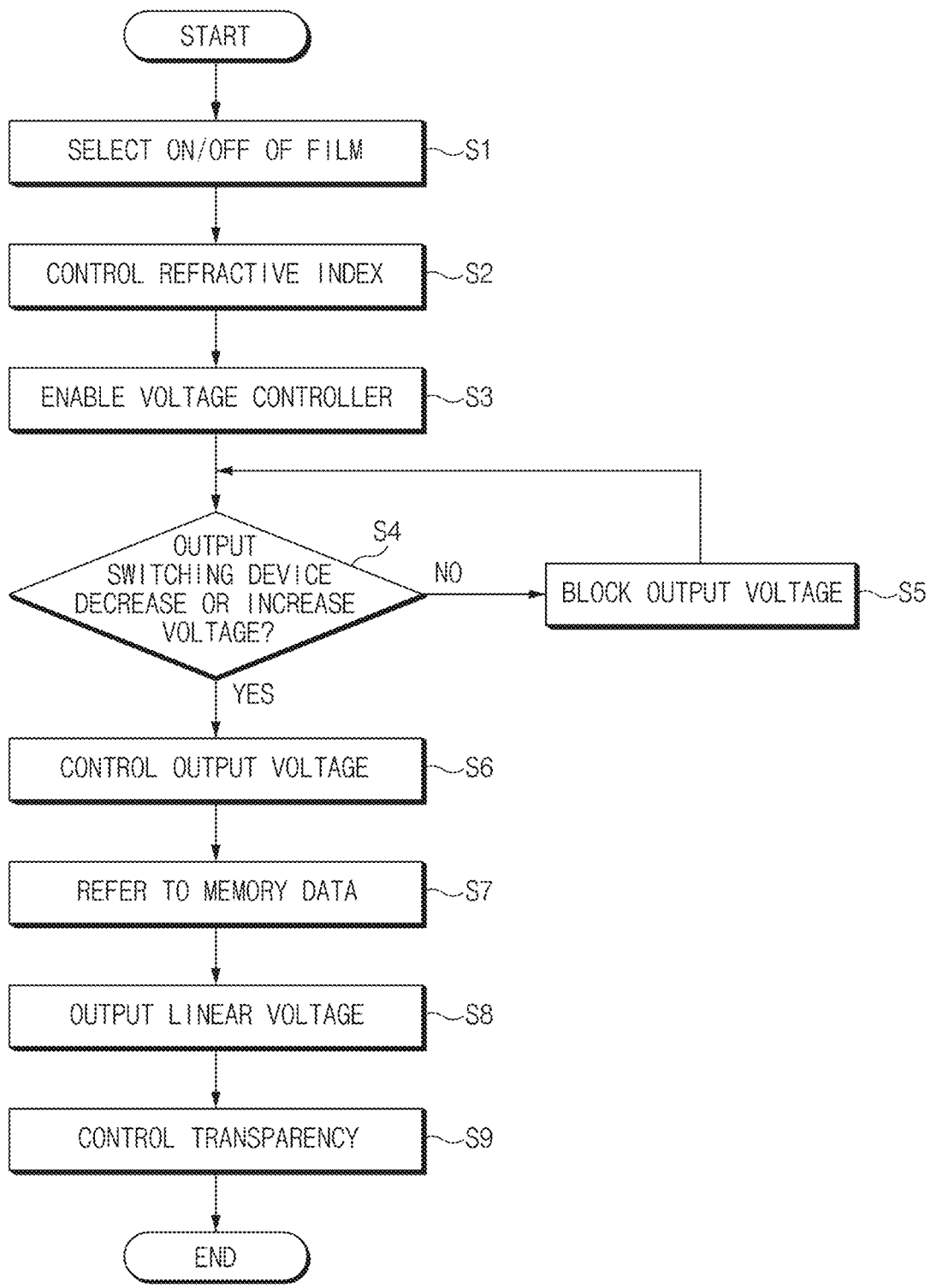
FIG. 14 is a flowchart illustrating a method of controlling a variable transparency glass according to an embodiment of the present disclosure.

FIG. 14 is a flowchart illustrating a method of controlling a variable transparency glass according to an embodiment of the present disclosure.

Referring to FIG. 14, the first film 11 and the second film 12 of the variable transparency glass 10 are selected to be turned on or off in S1. Thereafter, the refractive index of each of the selected first film 11 and second film 12 is controlled in S2.

Next, the voltage controller 20 is enabled in S3 and the output switching device 22 performs increase or decrease of the voltage in S4. When the shut-down occurs, the output voltage VOUT is cut off in S5.

Thereafter, the voltage controller 20 controls the output voltage VOUT provided to the variable transparency glass 10 corresponding to the control of the controller 30 in S6. The controller 30 controls the voltage level supplied to the variable transparency glass 10 with reference to the data stored in the memory 40 in S7. Then, the voltage controller 20 outputs the linear voltage to the variable transparency glass 10 in S8 to control the transparency of the variable transparency glass 10 in S9.

As described above, an embodiment of the present disclosure may apply the variable transparency glass to a window device for the autonomous vehicle. For example, the vehicle glass may be applied to a windshield glass, the sunroof, the door window, the rear glass, the inside mirror, the outside mirror, or the like.

In this case, an embodiment of the present disclosure may be implemented in the vehicle glass without changing a configuration of a glass hardware pre-configured in an existing vehicle. In addition, it is possible to improve merchantability while minimizing cost rise without deteriorating performance. Further, it is possible to improve technical and commercial competitiveness by adding the polarizing function.

That is, the transmittance of the vehicle glass may be automatically switched depending on the environment (e.g. weather, sunlight) using the simple switch operation to automatically shield sun's rays through the window. The privacy zone may be built in the autonomous vehicle to protect the passenger from the outside environment and to reflect needs of a consumer.

In addition, an embodiment of the present disclosure may replace an electrically-driven curtain and a tinting for the vehicle to reduce the cost. In addition, the use amount of an air conditioner may be decreased to reduce energy consumption. An embodiment of the present disclosure may be applied to the privacy zone, an energy saving region, or an aesthetic & invisible region.

In addition, an embodiment of the present disclosure may be applied to a device replacing blinds and curtains (car smart window field, office building, green house, commercial and residential building, greenhouse, security, privacy building, briefing room, conference room, video promotion room, situation center, or the like). Therefore, the glass having the variable transmittance may be implemented and used as the device replacing blinds and curtains.

In addition, an embodiment of the present disclosure may be used in an environmentally friendly energy reduction project. For example, it may be applied to eco-friendly buildings (a living space which automatically shields the sunlight on the windows) to save lighting, heating and cooling energy. As polysilicon is applied inside the glass, green energy technology may be implemented as solar power generation and power conversion.

Embodiments of the present disclosure allow the transparency of the glass to be variably controlled in response to the request of the user and the environment.

In addition, embodiments of the present disclosure provide the glass in which the transparency of the certain portion of the glass is selectively adjusted to precisely control the glass.

Furthermore, embodiments of the present disclosure are for illustrative purposes, those skilled in the art will understand that various changes, modifications, substitutions, and additions may be made hereto within the spirit and scope of the appended claims, and such changes and modifications should be considered to fall within the scope of the following claims.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A variable transparency glass comprising:
    a first film having a first transparent electrode on an inner surface of the first film;
    a second film having a second transparent electrode on an inner surface of the second film; and
    a liquid crystal capsule disposed between the first film and the second film and configured to control transmittance of an incident light in response to a voltage applied to each of the first transparent electrode and the second transparent electrode,
    wherein the transmittance is partially controlled corresponding to an aligning pattern of each of the first transparent electrode and the second transparent electrode when the first film and the second film overlap;
    wherein the glass is configured to be controlled in a transparent mode when a refractive index of the first film and a refractive index of the second film are both the same as a refractive index of the liquid crystal capsule; and
    wherein the glass is configured to be controlled in an opaque mode when the refractive index of the first film and the refractive index of the second film are different from the refractive index of the liquid crystal capsule.

2. The variable transparency glass of claim 1, wherein the transmittance is changed in response to a level of the voltage.

3. The variable transparency glass of claim 1, wherein the liquid crystal capsule is configured to linearly control the transmittance based on the voltage.

4. The variable transparency glass of claim 1, wherein the first film and the second film are aligned in a vertical direction, a horizontal direction, or a diagonal direction with respect to an optical axis and have an isotropic refractive index.

5. The variable transparency glass of claim 1, wherein the liquid crystal capsule has a polymer dispersed liquid crystal structure.

6. The variable transparency glass of claim 1, wherein the liquid crystal capsule is disposed between the first transparent electrode and the second transparent electrode and includes a variable transmissive layer of a liquid crystal polymer structure.

7. An apparatus comprising:
    a variable transparency glass configured to variably control transmittance depending on a voltage;

a voltage controller configured to supply the voltage to the variable transparency glass; and a controller configured to select a transmittance mode in response to input information and to control a level of the voltage based on the selected transmittance mode, wherein the variable transparency glass includes:
- a first film having a first transparent electrode on an inner surface of the first film;
- a second film having a second transparent electrode on an inner surface of the second film; and
- a liquid crystal capsule disposed between the first film and second film and configured to variably control transmittance of an incident light in response to the voltage applied to each of the first transparent electrode and the second transparent electrode, wherein the glass is configured to be controlled in a transparent mode when each refractive index of the first film and the second film is the same as a refractive index of the liquid crystal capsule; and wherein the glass is configured to be controlled in an opaque mode when each refractive index of the first film and the second film is different from the refractive index of the liquid crystal capsule.

8. The apparatus of claim 7, wherein the voltage controller comprises:
- a control signal generator configured to generate control signals that change a pulse width depending on control of the controller; and
- an output switching device configured to increase or decrease the voltage based on the control signals.

9. The apparatus of claim 8, wherein the output switching device is configured to linearly control the voltage based on the control signals.

10. The apparatus of claim 8, wherein the output switching device comprises:
- a plurality of switching elements configured to be selectively switched in response to the control signals; and
- a current ramping device configured to ramp a current flowing at the plurality of switching elements and to limit a foldback output current.

11. The apparatus of claim 10, wherein the output switching device is configured so that it does not supply the voltage during a shut-down operation when the plurality of switching elements turn off.

12. The apparatus of claim 7, wherein the controller is configured to differently control the transmittance based on a level value of the voltage when the transmittance mode is changed to a bright mode, a variable tinting mode, or a privacy mode.

13. The apparatus of claim 7, wherein the controller is configured to change the transmittance mode in response to environment information, user input information, or manual operation.

14. The apparatus of claim 7, further comprising a memory configured to store transmittance control information in response to the transmittance mode.

15. The apparatus of claim 14, wherein the memory includes a look-up table in which a value of the voltage is set in response to the transmittance mode.

16. The apparatus of claim 7, wherein the variable transparency glass is configured to partially control the transmittance corresponding to an aligning pattern of each of the first transparent electrode and the second transparent electrode when the first film and the second film overlap.

17. The apparatus of claim 16, wherein the variable transparency glass is divided into a plurality of regions within an overlapped region of the first film and the second film and is configured to differently control the transmittance depending on a potential difference of each region when an individual voltage is applied to each region.

18. The apparatus of claim 7, wherein the first transparent electrode and the second transparent electrode are aligned in a vertical direction, a horizontal direction, or a diagonal direction with respect to an optical axis and have an isotropic refractive index.

19. The apparatus of claim 7, wherein the liquid crystal capsule is disposed between the first transparent electrode and the second transparent electrode and includes a variable transmissive layer of a liquid polymer structure.

20. An apparatus comprising:
- a variable transparency glass configured to variably control transmittance depending on a voltage;
- a voltage controller configured to supply the voltage to the variable transparency glass; and
- a controller configured to select a transmittance mode in response to input information and to control a level of the voltage based on the selected transmittance mode, wherein the variable transparency glass includes:
- a first film having a first transparent electrode on an inner surface of the first film;
- a second film having a second transparent electrode on an inner surface of the second film; and
- a liquid crystal capsule disposed between the first film and second film and configured to variably control transmittance of an incident light in response to the voltage applied to each of the first transparent electrode and the second transparent electrode;

wherein the voltage controller comprises:
- a control signal generator configured to generate control signals that change a pulse width depending on control of the controller; and
- an output switching device configured to increase or decrease the voltage based on the control signals, the output switching device comprising a plurality of switching elements configured to be selectively switched in response to the control signals and a current ramping device configured to ramp a current flowing at the plurality of switching elements and to limit a foldback output current.

* * * * *